No. 731,207. Patented June 16, 1903.

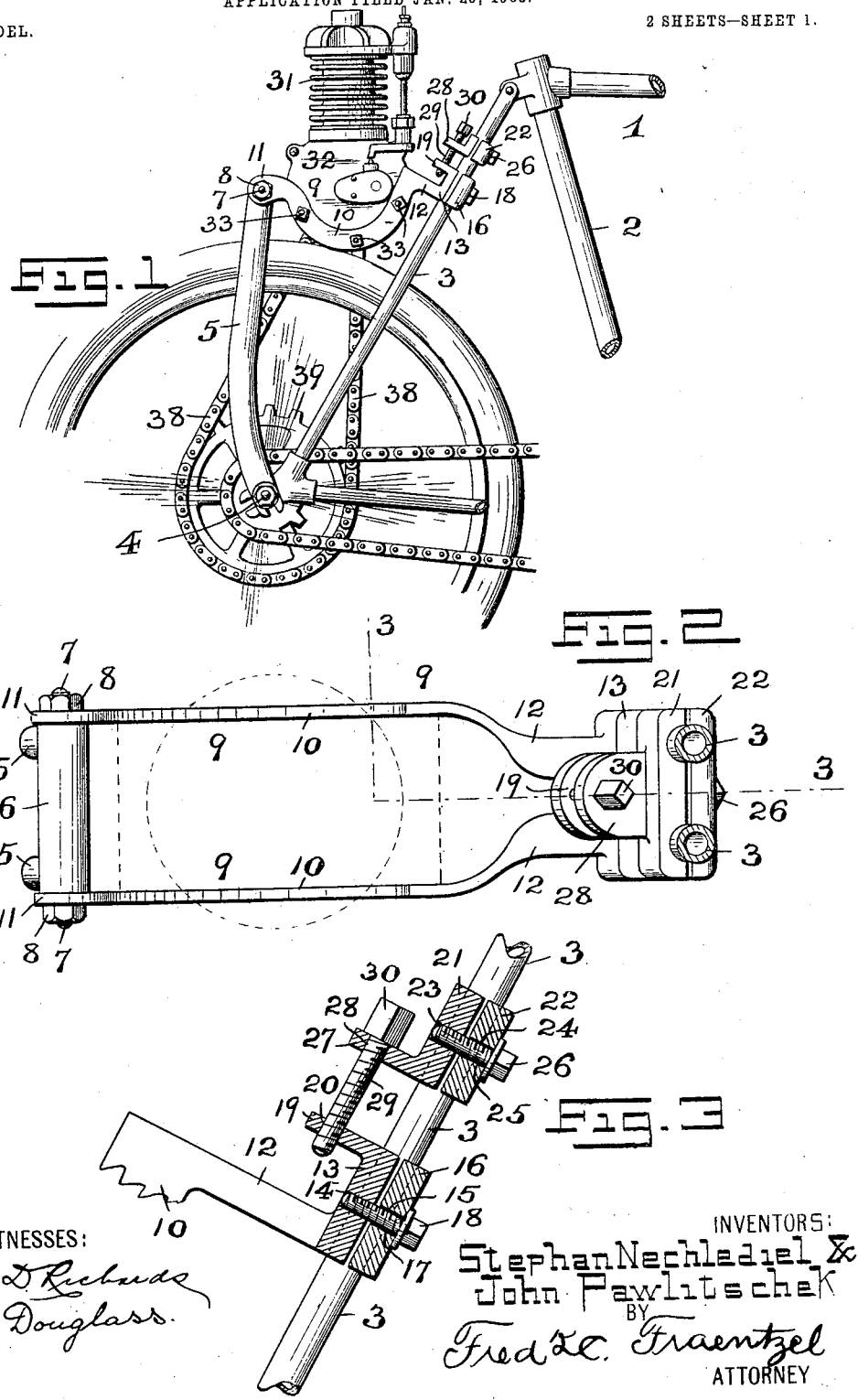

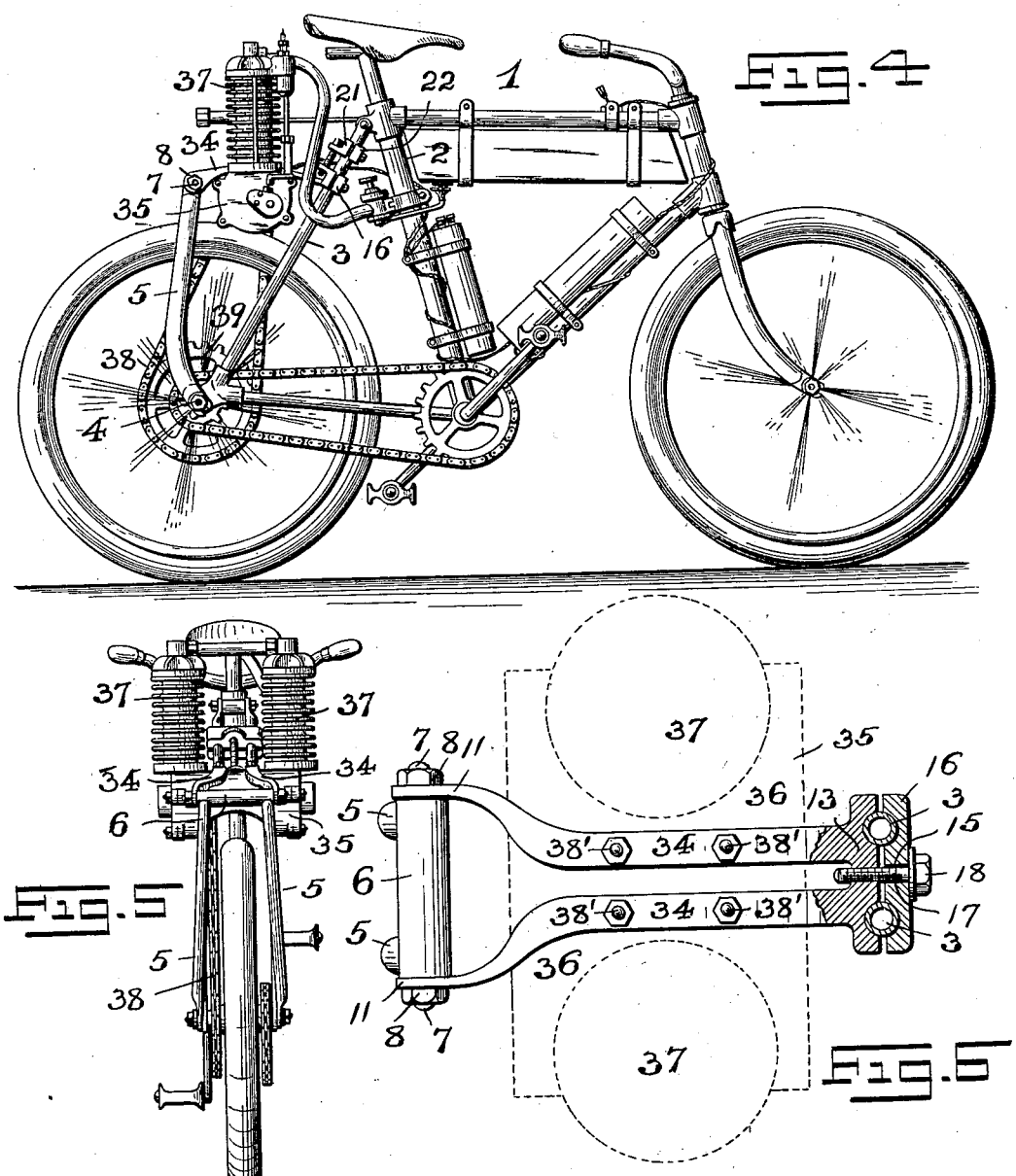

UNITED STATES PATENT OFFICE.

STEPHAN NECHLEDIEL, OF NEWARK, AND JOHN PAWLITSCHEK, OF ORANGE, NEW JERSEY.

MOTOR-CYCLE.

SPECIFICATION forming part of Letters Patent No. 731,207, dated June 16, 1903.

Application filed January 29, 1903. Serial No. 140,972. (No model.)

*To all whom it may concern:*

Be it known that we, STEPHAN NECHLEDIEL, residing at Newark, and JOHN PAWLITSCHEK, residing at Orange, in the county of Essex and State of New Jersey, both subjects of the Emperor of Austria-Hungary, have invented certain new and useful Improvements in Motor-Cycles; and we do hereby declare the following to be a full, clear, and exact description of the invention, such as will enable others skilled in the art to which it appertains to make and use the same, reference being had to the accompanying drawings, and to figures of reference marked thereon, which form a part of this specification.

The present invention has reference generally to improvements in motor-cycles; and the invention relates more particularly to a novel arrangement of motor upon the frame of a bicycle and a novel means of attachment of the motor upon the frame of the vehicle.

This invention has for its principal objects to provide simple means of attachment of the motor to the frame of the vehicle with a view of locating the heavy motor upon the rear end portion of the vehicle-frame back of the seat, whereby the weight of the motor is distributed at a point above the center of the rear wheel, and the vehicle thereby is more perfectly balanced.

The final results are that there is less danger of weakening the frame of the vehicle and the danger of accident is reduced to a minimum, and, furthermore, the vehicle is more easily propelled by the rider when using the pedals, and when striking a stone or other obstruction in the road there is less danger of upsetting the vehicle and throwing the rider.

With the various objects of the present invention in view our invention consists in the general arrangements of devices and combinations of parts, as well as in the details of construction of the means for attaching the motor to the frame of the bicycle, all of which will be fully set forth in the following specification, and then finally embodied in the clauses of the claim, which form a part of and are appended to the said specification.

The invention is clearly illustrated in the accompanying drawings, in which—

Figure 1 is a side view of the rear portion of the frame of a bicycle, a single-cylindered motor, and a novel means of attaching the said motor in position. Fig. 2 is a top or plan view of the frame or means for attaching said motor in position, the said view being made on an enlarged scale and the relative position of the motor with said frame being indicated in dotted outline. Fig. 3 is a longitudinal vertical section of said frame, said section being taken on line 3 3 in said Fig. 2. Fig. 4 is a side elevation of a bicycle provided with a double-cylindered motor and a modified construction of attaching frame or means for locating said motor at a point above the rear wheel of the bicycle and back of the seat or saddle. Fig. 5 is a rear view of the bicycle-frame, said motor, and said motor-attaching frame; and Fig. 6 is a plan view of said motor-attaching frame, a portion of said frame being represented in horizontal section.

Similar characters of reference are employed in all of said hereinabove-described views to indicate corresponding parts.

Referring now to the said drawings, the reference character 1 indicates the frame of the bicycle; 2, the saddle-post of said frame; 3, the rear fork, and 4 the rear axle of the vehicle. Suitably secured upon the opposite end portion of the rear axle 4 are a pair of upwardly-extending posts 5, which are secured at their upper ends to a laterally-extending bar 6, as clearly illustrated in Figs. 2 and 6. This bar 6 is usually a tube in which is a bolt or rod 7, having its opposite end portions provided with screw-threads for the reception and arrangement thereon of nuts 8.

The motor attaching or supporting frame employed with a single-cylindered motor, as represented in Figs. 1, 2, and 3, consists, essentially, of a pair of side bars or arms 9, provided with downwardly-curved parts 10 and having their perforated end portions 11 arranged upon the projecting ends of the bolt or rod 7 and secured in position against the ends of the bar 6 by means of the nuts 8, as illustrated. The curved parts 10 of said bars or arms 9 are made with forwardly-extending members 12, which are connected by means of a member 13, having a pair of grooves to enable the fitting of said member 13 upon the rear halves of the members of the fork 3. The said member is provided with a screw-threaded hole 14, into which is secured the end of a bolt 15, said bolt being passed through a hole 17 in a suitably-grooved clamping-plate 16 upon the opposite halves of the members of the fork 3, when the bolt 15 is screwed tight by means of its head 18. The said member 13 is also provided with a rearwardly-extending lug or projection 19, having a screw-hole 20. Located upon the opposite sides of the members of the fork 3, at a suitable point above the member 13 and plate 16, are two other suitably-grooved clamping-plates 21 and 22, the said plates being clamped in place by means of a bolt 25, which is passed through a hole 24 in the plate 22 and has its screw end screwed in a screw-threaded hole 23 in the plate 21 when turned by means of its head 26. The said plate 21 is also provided with a rearwardly-extending lug or projection 27, which is provided with a hole 28 for the reception of a bolt 29, having its lower end screwed in the screw-hole 20 of the lug 19 and tightly held by its head 30, thereby connecting the upper clamping means with the lower clamping means of the motor-attaching frame and providing a safe and strong means for attaching said frame to the fork 3 of the bicycle. Another purpose of the two clamping-plates 21 and 22 and the bolt 29 is to serve as a means for taking up the slack in the driving-chain 38 from the motor to the sprocket-wheel 39, which is readily accomplished by loosening the bolt 15 and turning the bolt 29 in the proper direction and when the proper adjustment is made then again tightening the bolt 15, whereby the parts are once more retained in their fixed positions.

The single-cylindered motor for driving the bicycle is indicated by the reference character 31, and 32 is the lower casing of the same. As will be seen from an inspection of Fig. 1, the curved parts 10 of the respective side bars 9 conform to the lower circular marginal edge of the said casing 32 and are secured against the opposite sides of said casing in any suitable manner, and preferably by means of bolts 33, as shown.

When the motor is a double-cylindered one, as indicated in Figs. 4 and 5, then the motor attachment or supporting frame comprises a pair of flat and closely-located supporting-bars 34, which are secured upon the upper flat surface 36 of the casing 35 and between the two cylinders 37 by means of the bolts 38', as indicated more especially in Fig. 6 of the drawings. In all other respects the general construction of this form of motor attaching and supporting frame is similar to that hereinabove described and need not, therefore, be further described in detail.

The novelty and general utility of our present invention will be clearly evident from the hereinabove description of the same, the main features of the same being the location of a motor for driving the bicycle directly above the rear axle and wheel of the vehicle back of the seat or saddle and the novel means of attachment of the motor to the frame of the vehicle, all for the purposes hereinabove set forth.

We are aware that changes may be made in the general arrangements of the devices and in the combinations of the parts without departing from the scope of the present invention. Hence we do not limit our invention to the exact arrangements of the devices and combinations of parts as described in the previous specification and as illustrated in the accompanying drawings, nor do we confine ourselves to the exact details of the construction thereof of the said parts.

Having thus described our invention, what we claim is—

1. In a motor-cycle, the combination, with the frame, of a motor located at the rear of said frame and above the rear wheel, and means for securing said motor in such position, comprising, upwardly-extending posts connected with the rear axle, and a motor-attaching frame, consisting, essentially, of a pair of side bars, having downwardly-curved parts adapted to lie flat against the sides of the motor-casing, bolts for securing said side bars to said casing, and a clamping means connected with said side bars for attaching the same to the frame of the vehicle, substantially as and for the purposes set forth.

2. In a motor-cycle, the combination, with the rear fork of the frame of a vehicle, and the rear axle, of a pair of upwardly-extending posts connected with said rear axle, a motor-attaching frame secured at one end to the upper ends of said posts, a clamping means at the other end of said frame for securing said frame to said rear fork, and a motor on said frame, said motor-attaching frame consisting, essentially, of a pair of side bars having downwardly-curved parts adapted to lie flat against the sides of the motor-casing, and bolts for securing said side bars to said casing, substantially as and for the purposes set forth.

3. In a motor-cycle, the combination, with the rear fork of the frame of the vehicle, and the rear axle, of a pair of upwardly-extending posts connected with said rear axle, a motor-attaching frame secured at one end to the upper ends of said posts, a clamping means at the other end of said frame for securing said frame to said rear fork, comprising a member 13 and a plate 16, a bolt for securing said plate 16 and member 13 about said fork, a rearwardly-extending lug 19 on said member 13, a pair of clamping-plates 21 and 22 and a bolt for securing said clamping-plates upon said forks, a rearwardly-extending lug 27 on said plate 21, and a bolt connecting the said lugs 19 and 27, and a motor on said frame, substantially as and for the purposes set forth.

4. In a motor-cycle, the combination, with the rear fork of the frame of the vehicle, and the rear axle, of a pair of upwardly-extending posts connected with said rear axle, a motor-attaching frame secured at one end to the upper ends of said posts, a clamping means at the other end of said frame for securing said frame to said rear fork, said motor-attaching frame consisting, essentially, of a pair of side bars having downwardly-curved parts adapted to lie flat against the sides of the motor-casing, and bolts for securing said side bars to said casing, and said clamping means comprising a member 13 and a plate 16, a bolt for securing said plate 16 and member 13 about said fork, a rearwardly-extending lug 19 on said member 13, a pair of clamping-plates 21 and 22 and a bolt for securing said clamping-plates upon said fork, a rearwardly-extending lug 27 on said plate 21, and a bolt connecting the said lugs 19 and 27, substantially as and for the purposes set forth.

In testimony that we claim the invention set forth above we have hereunto set our hands this 27th day of January, 1903.

STEPHAN NECHLEDIEL.
JOHN PAWLITSCHEK.

Witnesses:
FREDK. C. FRAENTZEL,
GEO. D. RICHARDS.